July 4, 1961  E. J. BUCZAK  2,991,077
PLAYGROUND EQUIPMENT RING CONSTRUCTION
Filed June 10, 1959
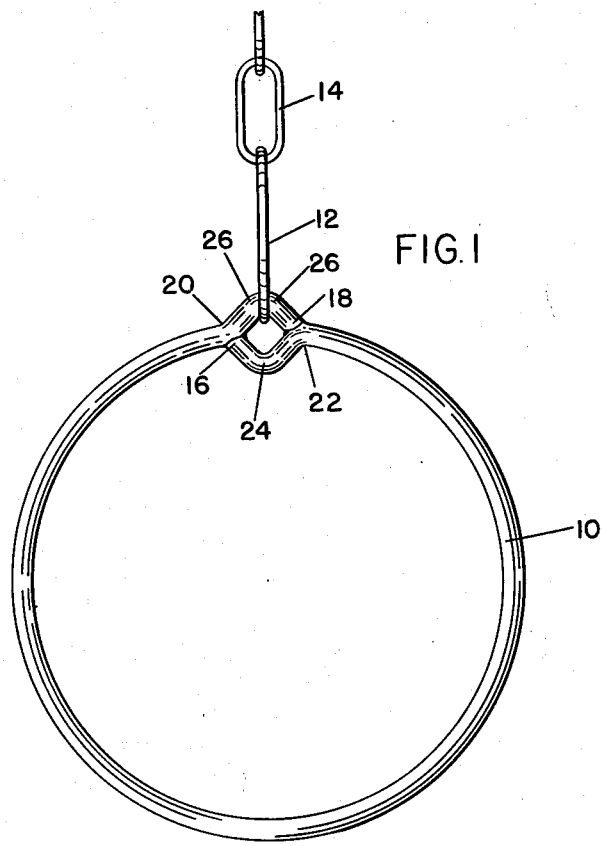
FIG. I
INVENTOR
EDWIN J. BUCZAK
ATTORNEY

United States Patent Office 2,991,077
Patented July 4, 1961

2,991,077
PLAYGROUND EQUIPMENT RING CONSTRUCTION
Edwin J. Buczak, Worcester, Mass., assignor to Parker Metal Goods Company, Worcester, Mass., a corporation of Massachusetts
Filed June 10, 1959, Ser. No. 819,378
4 Claims. (Cl. 272—61)

This invention relates to a new and improved playground equipment ring construction, and the principal object of the invention resides in the provision of a stronger ring, which may be used as a trapeze ring or for any kind of physical endeavor or exercise in the playground or gymnasium, such ring being provided with a new and improved completely enclosed trap means in a portion thereof for atachment of a hook, chain, or cord thereto so that the hook chain, etc. cannot relatively slide around the ring and thus renders the same safer than similar rings of the prior art as well as providing a definite point for suspension of the ring.

Other objects and advantages of the invention will appear hereinafter.

Reference is to be had to the accompanying drawing, in which the figure is a view in front elevation illustrating the invention.

Playground equipment or gymnasium rings are old and well known in the art but as is well known, they have a disadvantageous feature which is that when connected to an S-hook or a chain, or other suspensive support, the ring is capable of sliding around circumferentially in the S-hook, eye, chain link, or whatever object is used to suspend the same. The present invention does away with this difficulty in a very simple and efficient construction which not only renders the ring safer and permanently locates the ring with reference to its suspension means, but also provides a much stronger connection for the two ends of the wire forming the ring as will be made more apparent hereinafter.

With reference to the drawing, the reference numeral 10 indicates a wire which is generally formed into the shape of a ring. Ordinarily the two ends of the wire will merely be butt-welded or otherwise connected together, or an outwardly directed bend may be formed therein to provide for suspending the same by means of an S-hook which is generally indicated here at 12 or by means of a chain 14, cord, hoop or the like.

In the present case, the ends of the wire 10 are indicated at 16 and at 18. These ends overlap each other as plainly shown in the drawing, and each end is welded or otherwise secured to a point on the opposite end of the wire spaced inwardly from the terminal portion, these points being indicated at 20 and 22 respectively.

Now between the terminal portion 16 and the point 22, to which the terminal portion 18 is welded or otherwise secured, the material of the wire is bent inwardly forming a dip directed generally radially inwardly with respect to the ring and indicated at 24.

Between the terminal portion 18 and the point 20 to which terminal portion 16 is welded, the material of the wire ring is bent outwardly, corresponding but reverse to the bend at 24 and this has been indicated at 26.

By this means, a kind of trap 28 has been formed and this trap is somewhat in the nature of a small square or substantially annular enclosure having continuous side walls and having a diameter a great deal smaller than that of the ring 10. However, the essential characteristic of this trap is that it is completely enclosed and the S-hook or link connected therewith, being closed on the portion 26, is completely trapped thereby and is unable under any circumstances to travel around the length of the wire ring. Stated differently, the wire ring cannot travel circumferentially around through the S-hook or the end link of the chain 14, etc.

There being the two welds recited, the connection for the two ends of the ring is doubled in strength over that ordinarily found. Also the ends of the wires at 16 and 18 are butt-welded to the surfaces of the wire rather than the two ends themselves merely being butt-welded, and this also provides a safer construction. By having the ring 10 always located in the position shown in the drawing, that is, not capable of sliding around in the S-hook 12 to any position, the ring is capable of being formed with hand-grips or the like at any particular location desired, or it may be padded, etc., at specific locations, which locations will always remain in the same relative position to the suspending means.

Having thus described my invention and the advantages thereof, I do not wish to be limited to the details herein disclosed, otherwise than as set forth in the claims, but what I claim is:

1. A playground equipment ring to be suspended from above comprising a generally annular wire member having an outwardly extending bent portion therein at one point thereon for the reception of means suspending the ring, and means forming a portion of the wire member traversing the outwardly bent portion and forming a wholly enclosed trap for the suspending means.

2. A playground equipment ring to be suspended from above comprising a generally annular wire member having an outwardly extending bent portion therein at one point thereon for the reception of means suspending the ring, another portion of the wire member traversing and closing the outwardly bent portion and forming a wholly enclosed trap for the suspending means, said last-named portion being bent inwardly.

3. A playground equipment ring to be suspended from above comprising a generally annular wire member having an outwardly extending bent terminal portion therein at one point thereon for the reception of means suspending the ring, another terminal portion of the wire member traversing and closing the outwardly bent portion and forming a wholly enclosed trap for the suspending means, said last-named portion being bent inwardly, each of said two terminal portions being secured at the end thereof adjacent to the other end and the points of securement defining the trap which is located between the points of securement.

4. A playground equipment ring comprising an annular wire member having a pair of terminal portions connected together to render the same endless and gap-less, one terminal portion extending sharply outwards and reversely inwards, the other terminal portion extending sharply inwards and reversely outwards, these extensions coinciding and overlapping and forming a trap for a suspension device, the terminal portions being secured to each other at spaced points forming the limits of the respective inward and outward extensions, the trap being fixed, continuous, and gap-less so that the suspension device is permanently held therein and prevented from relative sliding motion on the ring.

References Cited in the file of this patent
UNITED STATES PATENTS

| | | |
|---|---|---|
| D. 169,246 | Eisenberg | Apr. 7, 1953 |
| 1,012,212 | Mells | Dec. 19, 1911 |
| 1,108,003 | Reach | Aug. 18, 1914 |
| 2,430,966 | Taylor | Nov. 18, 1947 |
| 2,738,643 | Money et al. | Mar. 20, 1956 |